United States Patent
Hévizi et al.

(10) Patent No.: US 10,382,283 B2
(45) Date of Patent: Aug. 13, 2019

(54) NETWORK TOPOLOGY ESTIMATION BASED ON EVENT CORRELATION

(71) Applicant: Telefonaktiebolaget LM Ericsson (publ), Stockholm (SE)

(72) Inventors: László Hévizi, Piliscsaba (HU); Gábor Magyar, Dunaharaszti (HU)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 251 days.

(21) Appl. No.: 15/318,002

(22) PCT Filed: Jul. 8, 2014

(86) PCT No.: PCT/EP2014/065545
§ 371 (c)(1),
(2) Date: Dec. 12, 2016

(87) PCT Pub. No.: WO2016/004981
PCT Pub. Date: Jan. 14, 2016

(65) Prior Publication Data
US 2017/0134240 A1    May 11, 2017

(51) Int. Cl.
*H04L 12/24* (2006.01)

(52) U.S. Cl.
CPC ............ *H04L 41/12* (2013.01); *H04L 41/064* (2013.01); *H04L 41/065* (2013.01);
(Continued)

(58) Field of Classification Search
CPC ..... H04L 41/06; H04L 41/12; H04L 41/0618; H04L 41/064; H04L 41/065; H04L 41/069; H04L 41/0677; H04L 41/0627
(Continued)

(56) References Cited

U.S. PATENT DOCUMENTS

2004/0230873 A1* 11/2004 Ward ................ H04L 41/0631
714/39
2012/0155321 A1    6/2012 Yang et al.
(Continued)

FOREIGN PATENT DOCUMENTS

EP    2592550 A1 *  5/2013  ............. H04L 41/12
EP    2592550 A1     5/2013

OTHER PUBLICATIONS

Natu et al; Using Temporal Correlation for Fault Localization in Dynamically Changing Networks; May 14, 2007; International Journal of Network Management (Year: 2007).*

(Continued)

*Primary Examiner* — Glenford J Madamba
(74) *Attorney, Agent, or Firm* — Patent Portfolio Builders, PLLC

(57) ABSTRACT

A management node (100) obtains indications of network events occurring at a plurality of nodes (210-1, 210-2, 210-3, 210-4, 220-1, 220-2, 230-1, 230-2) of the communication network. Further, the management node (100) performs a correlation of times of the indicated network events. On the basis of the correlation, the management node (100) identifies clusters of nodes (210-1, 210-2, 210-3, 210-4, 220-1, 220-2, 230-1, 230-2) with correlated network events. On the basis of the clusters, the management node (100) determines a topology model of the communication network.

18 Claims, 10 Drawing Sheets

(52) U.S. Cl.
CPC ........ *H04L 41/069* (2013.01); *H04L 41/0618* (2013.01); *H04L 41/0627* (2013.01); *H04L 41/0677* (2013.01)

(58) Field of Classification Search
USPC ........................................................ 709/224
See application file for complete search history.

(56) References Cited

U.S. PATENT DOCUMENTS

2013/0227055 A1   8/2013   Vasseur et al.
2015/0281105 A1   10/2015  Vadema et al.

OTHER PUBLICATIONS

Natu et al; "Using temporal correlation for fault localization in dynamically changing networks"; International Journal of Network Management; May 14, 2007; pp. 303-316; vol. 18, No. 4; X{055023276.

* cited by examiner

NETWORK TOPOLOGY ESTIMATION BASED ON EVENT CORRELATION

TECHNICAL FIELD

The present invention relates to methods for managing a communication network and to corresponding devices.

BACKGROUND

Current communication networks are typically based on complex structures involving numerous nodes and links between such nodes. For example, a cellular communication network may include one or more access networks, transport networks, and core networks. Assuming such organization, base stations that are directly involved in serving radio connections to end devices are part of the access network, and wireline and/or wireless backhaul networks that connect nodes of the access network to the core network are part of the transport network. The transport network can be a general-purpose data network with mixed technology and protocol hierarchy, and its role is to reliably convey data between the access network and the core network.

The transport network may include microwave links, copper links, and/or optical links. In many cases, operators of cellular communication networks utilize leased lines and other forms of transport services from third party operators. Further, the transport network is typically based on the Internet Protocol (IP), which means that the nodes of the access network appear as IP nodes in the transport network. Network management thus basically corresponds to management of logical connections between base stations and nodes of the core network, while the actual links in the transport network are managed by third party operators or external tools. Further, the access networks and transport networks may be subject to frequent reconfiguration.

Accordingly, the operator of the cellular communication network may have only limited knowledge about the network topology of the transport network. However, such knowledge may be useful for various purposes, e.g., network configuration, network management, and trouble shooting, e.g., for handling alarms.

In US 2012/0155321 A1, a method is described which allows for discovering and updating a network topology underlying a wireless communication network by utilizing configuration information from nodes of the wireless communication network. However, this method relies on dedicated reporting functionalities of the individual nodes.

Accordingly, there is a need for techniques which allow for efficiently managing a communication network with a priori unknown or dynamically changing network topology.

SUMMARY

According to an embodiment of the invention, a method of managing a communication network is provided. According to the method, a management node obtains indications of network events occurring at a plurality of nodes of the communication network. Further, the management node performs a correlation of times of the indicated network events. On the basis of the correlation, the management node identifies clusters of nodes with correlated network events. On the basis of the clusters, the management node determines a topology model of the communication network.

According to a further embodiment of the invention, a management node for a communication network is provided. The management node comprises at least one interface for obtaining indications of network events occurring at a plurality of nodes of the communication network. Further, the management node comprises at least one processor. The at least one processor is configured to obtain the indications of network events. Further, the at least one processor is configured to perform a correlation of times of the indicated network events. Further, the at least one processor is configured to identify, on the basis of the correlation, clusters of nodes with correlated network events. Further, the at least one processor is configured to determine, on the basis of the clusters, a topology model of the communication network.

According to a further embodiment of the invention, a computer program or computer program product is provided, e.g., in the form of a non-transitory storage medium, which comprises program code to be executed by at least one processor of a management node of a communication network. Execution of the program code causes the at least one processor to obtain indications of network events occurring at a plurality of nodes of the communication network. Further, execution of the program code causes the at least one processor to perform a correlation of times of the indicated network events. Further, execution of the program code causes the at least one processor to identify, on the basis of the correlation, clusters of nodes with correlated network events. Further, execution of the program code causes the at least one processor to determine, on the basis of the clusters, a topology model of the communication network.

Details of such embodiments and further embodiments will be apparent from the following detailed description of embodiments.

DETAILED DESCRIPTION OF EMBODIMENTS

Figure 1:
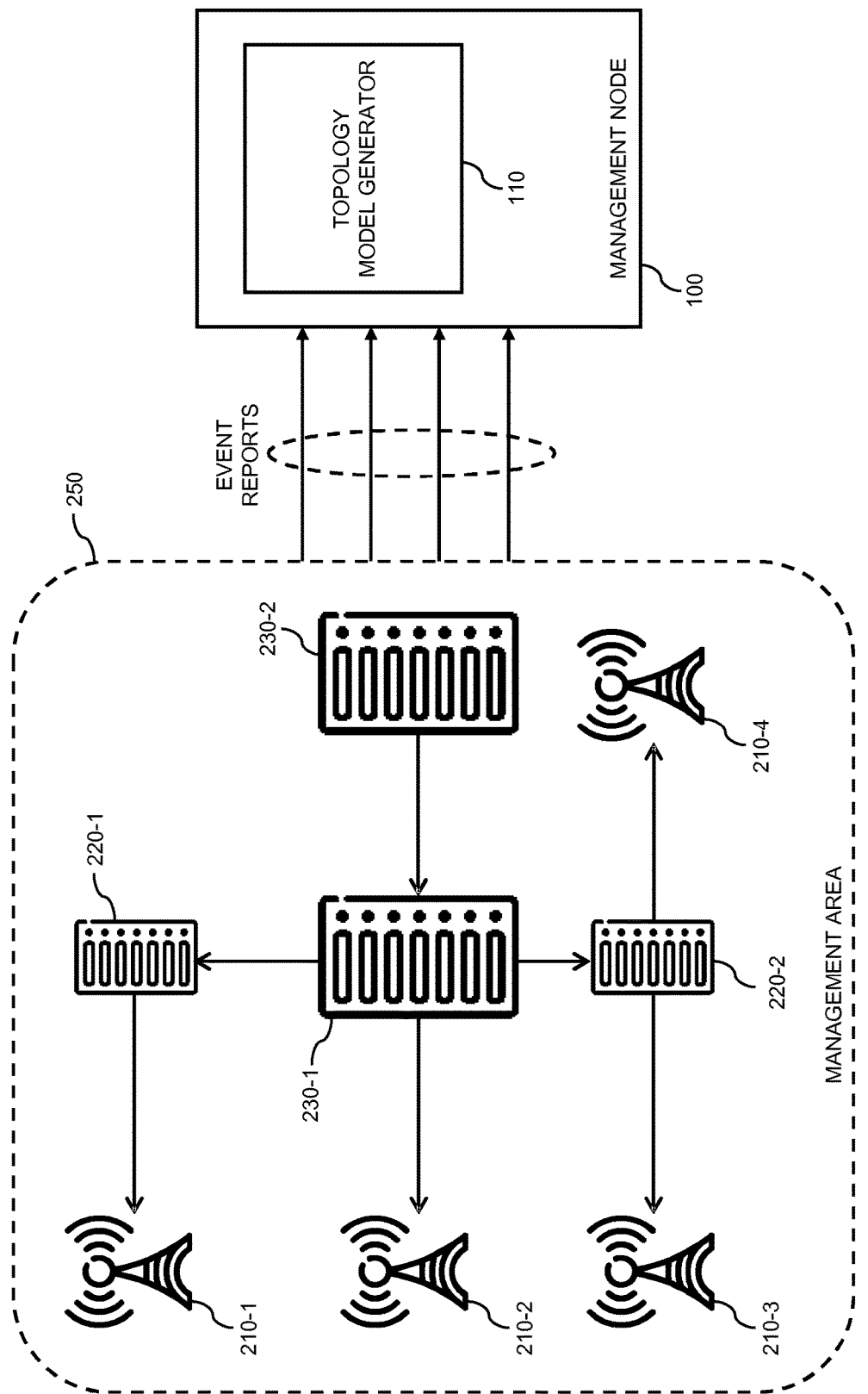
FIG. 1 schematically illustrates a communication network in which determination of a network topology is performed according to an embodiment of the invention.

In the following, concepts according to embodiments of the invention will be explained in more detail by referring to the accompanying drawings. The illustrated concepts relate to management of a communication network. Specifically, the concepts relate to determination of a topology model for at least a part of the communication system and to utilization of such topology model, e.g., for efficient handling of alarms or other event reports. The communication network may for example be a cellular communication network, e.g., based on the LTE (Long Term Evolution) technology, UMTS (Universal Mobile Telecommunications System) technology, or GSM (Global System for Mobile Communications) technology specified by 3GPP (3$^{rd}$ Generation Partnership Project). In the illustrated exemplary implementations it is assumed that the concepts are applied with respect to a backhaul of the cellular network, i.e., a transport network which conveys data between nodes of an access network part and nodes of a core network part of the cellular communication network. However, it is to be understood that the concepts may also be applied with respect to other network parts or with respect to other types of communication networks, e.g., wireline communication networks.

In the concepts as illustrated in the following, network events are used as a basis for deriving the topology model. In particular, a time correlation of network events occurring at different nodes of the communication network is performed. Such network events may for example be reported or otherwise indicated by the nodes. On the basis of the time correlation, clusters of nodes with correlated network events are identified. Each of such clusters includes multiple nodes, and in the time correlation, the network events which occurred at these multiple nodes have been identified as being time correlated. The clusters are then in turn used as a basis for determining the topology model. The topology model may generally be represented in the form of a tree-like graph. However, also topological redundancies may occur, e.g., at larger aggregation links as typically present in parts of the transport network which are close to the core network part. Such redundancy may for example be associated with a ring in an optical metro network.

For determining the topology model, a hierarchy of the clusters may be determined by identifying whether a certain cluster is a subset of another cluster. In this way, dependencies between the nodes may be systematically learned and used to build the topology model. By continuously monitoring newly occurring network events, the topology model may be updated and refined during regular operation of the communication network.

The topology model may be used for various purposes. For example, the topology model may be used to identify a common source of multiple alarms, which then may be grouped under a single trouble ticket. Such assisted grouping of related alarms may allow for saving operational costs.

In the considered example of a cellular communication network, the majority of base stations in the access network correspond to leaves in a tree-like representation of the topology model. The traffic of the base stations may in turn be regarded as being routed through several tree branches and aggregation points. The aggregation points may at the same time correspond to base station sites. Therefore, network events, e.g., alarms or the like, which occur at some point in the tree-like topology may have impact on other nodes which are located further towards the leaves. For example, a link failure at an aggregation point might induce a number of simultaneous "missing cell" alarms at a base station controller node. In the illustrated concepts, such relations between network events occurring at different nodes may be utilized to infer and refine the network topology model.

Also reconfigurations of the communication network or other changes in the structure of the communication network may be considered. For example, a reconfiguration might result in correlations of network events which are in conflict with the current topology model. Such conflicts may be resolved on the basis of a probabilistic metric. Specifically, such probabilistic metric may be used to decide whether such conflicting correlation is merely accidental or if it is due to an actual reconfiguration of the communication network. In the latter case, the detected conflicting coincidence may be used for determining an updated topology model in which the conflict is resolved. For example, in such updated topology model certain links may be removed or modified.

FIG. 1 schematically illustrates exemplary structures of the communication network. More specifically, FIG. 1 shows nodes 210-1, 210-2, 210-3, 210-4, 220-1, 220-2, 230-1, 230-2 of the communication network which are located in a certain management area 250. Further, FIG. 1 shows a management node 100 which receives event reports from the nodes 210-1, 210-2, 210-3, 210-4, 220-1, 220-2, 230-1, 230-2 in the management area 250. As illustrated, the nodes 210-1, 210-2, 210-3, 210-4, 220-1, 220-2, 230-1, 230-2 may include base stations 210-1, 210-2, 210-3, 210-4 which serve radio cells of the communication network. For example, such base stations 210-1, 210-2, 210-3, 210-4 may correspond to radio base stations of the GSM radio technology, to base stations of the UMTS radio technology, also referred to as "Node B" (NB), or to base stations of the LTE radio technology, also referred to as "evolved Node B" (eNB). Further, the nodes may include transport nodes 220-1, 220-2, 230-1, 230-2 which convey data traffic between the base stations 210-1, 210-2, 210-3, 210-4 and a core network (not illustrated in FIG. 1) of the communication network. As can be seen, the nodes 210-1, 210-2, 210-3, 210-4, 220-1, 220-2, 230-1, 230-2 are arranged in a tree-like topology, in which the transport nodes 230-1, 230-2 form a trunk, the transport nodes 220-1, 220-2 form branches, and the base stations 210-1, 210-2, 210-3, 210-4 form leaves.

For providing the event reports to the management node 100, at least some of the nodes 210-1, 210-2, 210-3, 210-4, 220-1, 220-2, 230-1, 230-2 may be provided with corresponding management interfaces. Here, it should be understood that an event report indicating a network event with respect to a certain node 210-1, 210-2, 210-3, 210-4, 220-1, 220-2, 230-1, 230-2 may be generated and sent by this node 210-1, 210-2, 210-3, 210-4, 220-1, 220-2-230-1, 230-2 itself, but could also be generated and sent by some other node 210-1, 210-2, 210-3, 210-4, 220-1, 220-2, 230-1, 230-2. For example, the base station 210-1 may send an event report indicating a loss of backhaul connectivity of the base station 210-1 (which of course implies that the loss of backhaul connectivity does not prevent sending the event report). Alternatively, the transport node 220-1 could send an event report indicating a loss of backhaul connectivity to the base station 210-1. Further, it is also possible that an event report indicates different network events occurring at different nodes 210-1, 210-2, 210-3, 210-4, 220-1, 220-2, 230-1, 230-2.

Figure 2:
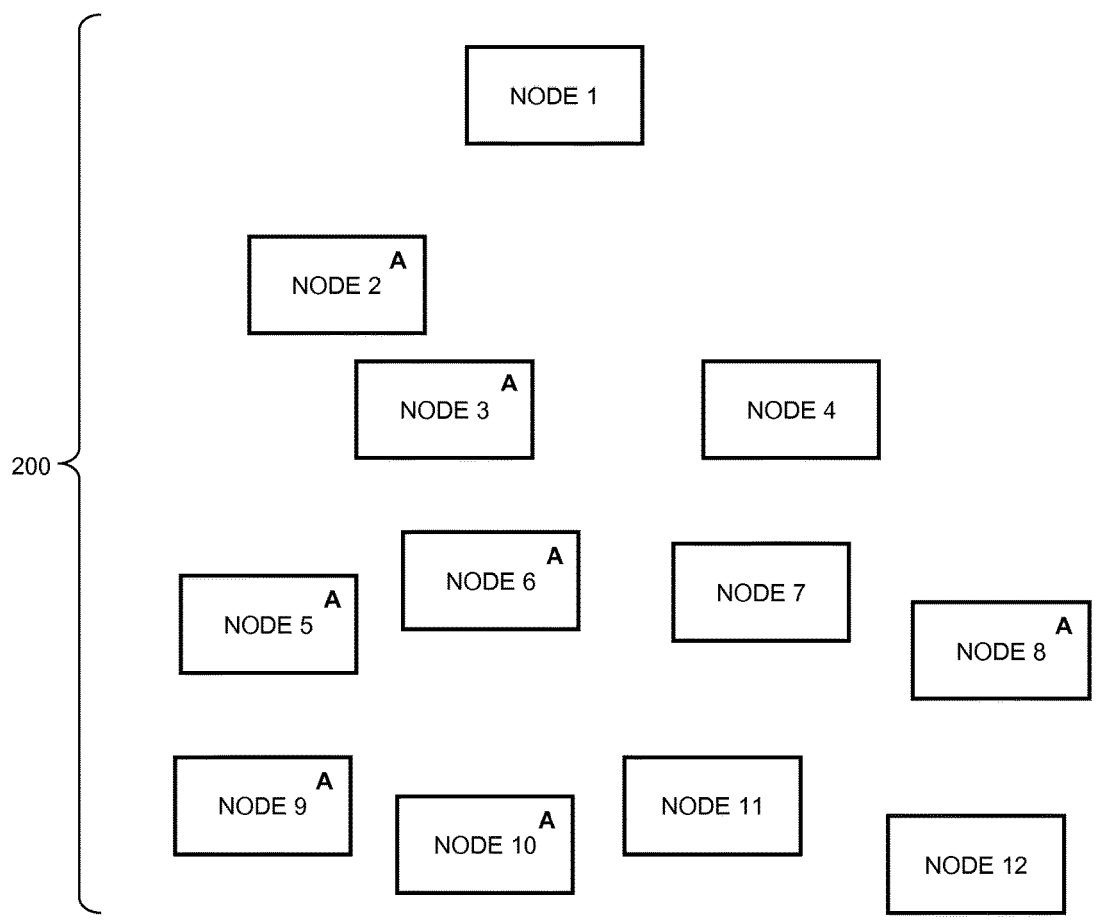
FIG. 2 schematically illustrates exemplary nodes of the communication network.

The management node 100 is configured with functionalities for implementing the management functionalities as outlined above. Specifically, the management node 100 is provided with a topology model generator 110 for implementing determination of the topology model on the basis of the event reports. In the following, exemplary processes underlying the determination of the topology model will be described in more detail. FIG. 2 illustrates an exemplary set of nodes 200 ("NODE 1", "NODE 2", "NODE 3", "NODE 4", "NODE 5", "NODE 6", "NODE 7", "NODE 8", "NODE 9", "NODE 10", "NODE 11", "NODE 12" to which such processes for which determination of a topology model may be applied.

To provide a basis for the determination of the topology model, indications of network events are obtained. For example, as mentioned on connection with FIG. 1, the topology model generator 110 may collect event reports from the nodes 200. For each indicated network event, a time of the network event and an associated node 200 may be recorded. Additional information may be recorded as well, e.g., a type of the network event. Examples of such types of network events are alarms, status modifications, link failures, or the like. In the example of FIG. 2, network events are assumed to be indicated for the nodes marked with "A", i.e., NODE 2, NODE 3, NODE 5, NODE 6, NODE 8, NODE 9, and NODE 10.

Figure 3:
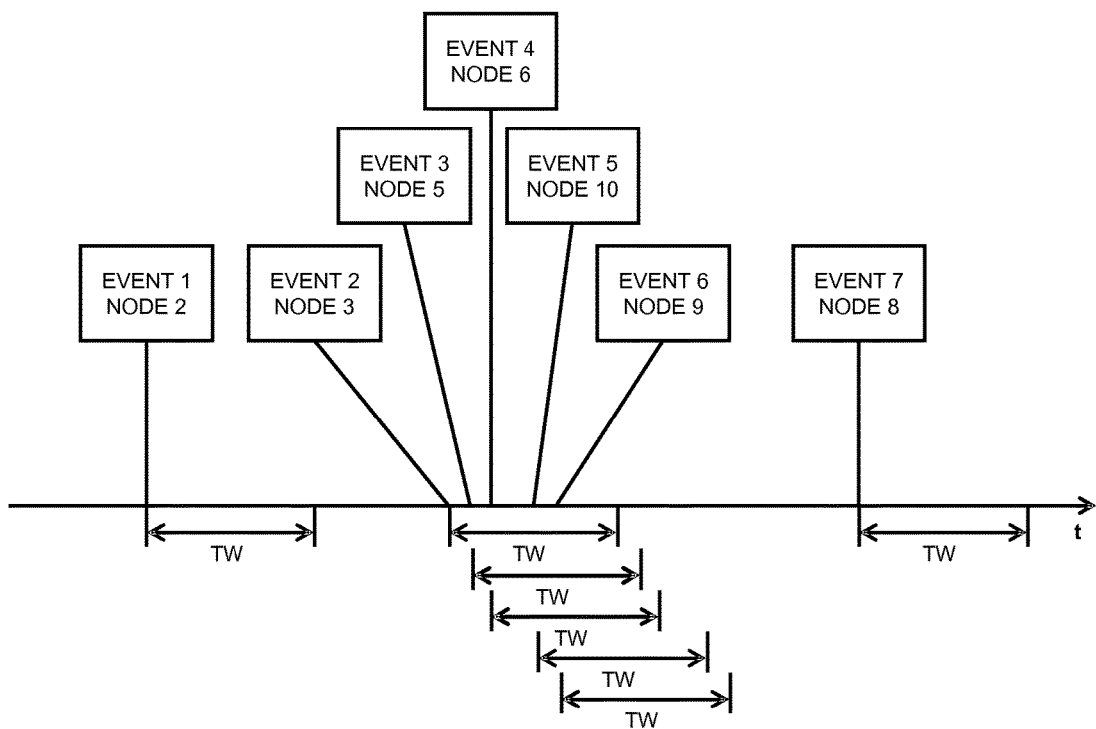
FIG. 3 schematically illustrates an exemplary sequence of network events occurring at some of the nodes of FIG. 2.

The topology model generator 110 may then subject the recorded network events to a time correlation process. For this purpose, a time window may be defined, and two network events which occur within this time window may be deemed as being correlated. The length of time window may be defined in accordance with typical propagation times of event information in the communication network. For example, in a typical cellular communication network utilizing LTE or UMTS technology, a length of a few seconds, e.g., about 5 s, may be appropriate. In some implementations, also a variable size of the time window may be utilized, or different lengths of the time window may be applied with respect to the same set of indicated network events, e.g., to check for consistency of the detected correlation. FIG. 3 illustrates an exemplary sequence of the network events indicated for NODE 2, NODE 3, NODE 5, NODE 6, NODE 8, NODE 9, and NODE 10, and the utilization of such time window, in FIG. 3 indicated by TW.

As illustrated in FIG. 3, a first network event ("EVENT 1") occurs at NODE 2". However, within the time window TW starting at the time of the first network event no further network event is detected. Accordingly, the network topology generator 110 detects no correlation of the first network event to other network events.

Then a second network event ("EVENT 2") occurs at NODE 3. Before expiry of the time window TW starting at the time of the second network event, a third, fourth, fifth and sixth network event ("EVENT 3", "EVENT 4", "EVENT 5", "EVENT 6") occur at NODE 5, NODE 6, NODE 10, and NODE 9. Accordingly, the network topology generator 110 identifies the third, fourth, fifth and sixth network event as being correlated.

A seventh network event ("EVENT 7") occurs at NODE 8, outside the time window TVV starting at the time of the second network event, and no further network event occurs within the time window TW starting at the time of the seventh network event. Accordingly, the network topology generator 110 detects no correlation of the seventh network event to the first, second, third, fourth, fifth or sixth network event or to any other network events.

In the example of FIG. 3, a variable size of the effective time window may be implemented by restarting the time window TVV each time when a new network event occurs before the time window TW ends, as schematically illustrated for the third, fourth, fifth, and sixth network event. Such variable extension of the effective time window may be useful when multiple intermediate nodes are connected between two nodes with potentially correlated network events. In particular, typical propagation delays concerning the event information due to the intermediate nodes may be considered in this way.

In a next stage, the network topology generator 110 may assign those nodes 200 to the same cluster, which were identified as having correlated network events. Accordingly, in the example of FIGS. 2 and 3, NODE 3, NODE 5, NODE 6, NODE 9, and NODE 10 would be assigned to a cluster.

Figure 4:
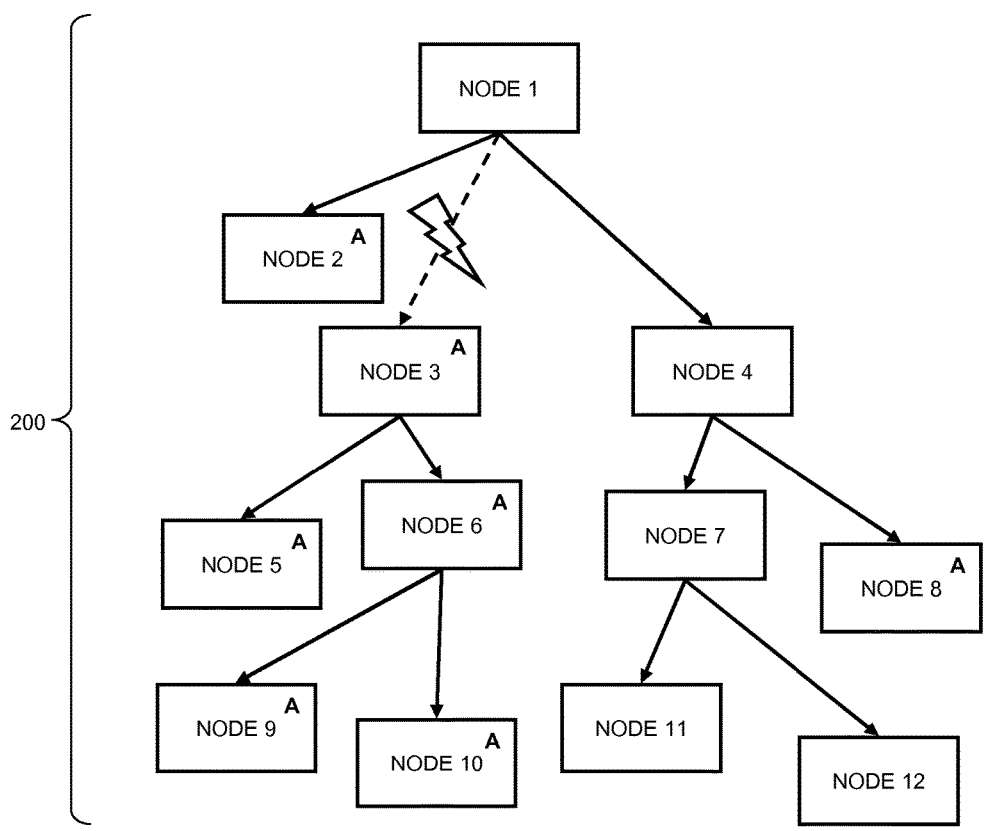
FIG. 4 schematically illustrates an underlying network topology for the nodes of FIG. 2.

FIG. 4 shows the underlying network topology which explains the correlation of the network events detected for NODE 3, NODE 5, NODE 6, NODE 9, and NODE 10. As illustrated, NODE 3, NODE 5, NODE 6, NODE 9, and NODE 10 are located on the same branch of a tree-like topology, and their connectivity is affected by a failure of the link between NODE 1 and NODE 3.

Corresponding processes may be repeated for further network events indicated with respect to the nodes 200, thereby obtaining a dataset with multiple detected clusters. The detection of clusters may require that a number of occurrence of a certain cluster exceeds a threshold, e.g., of three. In this way, accidental coincidences of network events may be filtered out. In such dataset of detected clusters, two different clusters may overlap, i.e., include one or more nodes which are present in both clusters. Still further, one cluster may be a subset of another cluster, i.e., the nodes of one of the clusters may all be elements of the other cluster. Such relationships among the different clusters may be utilized for determining a hierarchy of the clusters. An exemplary hierarchy graph of detected clusters is illustrated in FIG. 5.

Figure 5:
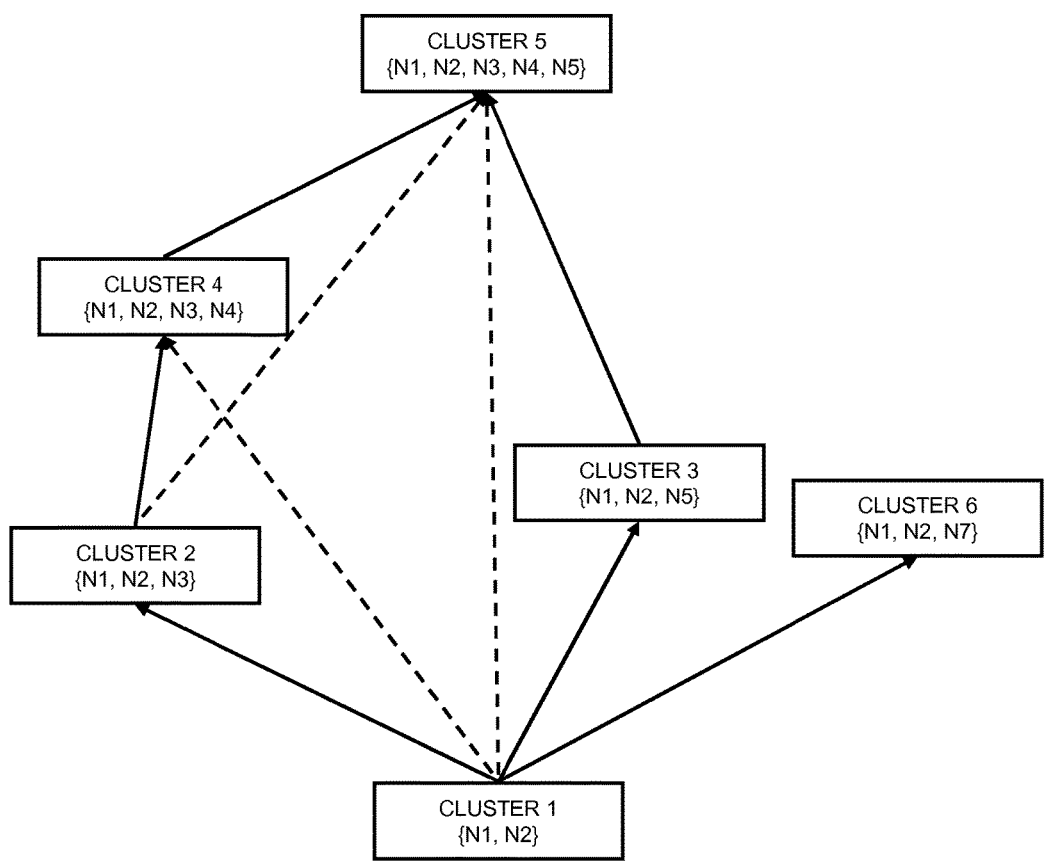
FIG. 5 shows an exemplary hierarchy of clusters as determined according to an embodiment of the invention.

FIG. 5 illustrates exemplary clusters referred to as "CLUSTER 1", "CLUSTER 2", "CLUSTER 3", "CLUSTER 4", "CLUSTER 5", and "CLUSTER 6". As mentioned above, each cluster is formed of multiple nodes for which correlated network events were identified. In the hierarchy graph of FIG. 5, the clusters form vertices, and edges between the vertices indicate an inclusion relationship between the connected clusters, i.e., an arrow from one cluster to another indicates that the cluster is a subset of the other cluster. In the example of FIG. 5, CLUSTER 1 includes nodes N1 and N2 and is a subset of CLUSTER 2 (including nodes N1, N2, and N3), a subset of CLUSTER 3 (including nodes N1, N2, and N5), a subset of CLUSTER 4 (including nodes N1, N2, N3, and N4), a subset of CLUSTER 5 (including nodes N1, N2, N3, N4, and N5), and a subset of cluster 6 (including nodes N1, N2, and N7). CLUSTER 2 is a subset of CLUSTER 4 and a subset of CLUSTER 5. CLUSTER 3 is a subset of CLUSTER 5. CLUSTER 4 is a subset of CLUSTER 5. CLUSTER 5 and CLUSTER 6 are no subset of any other detected cluster.

The relationships between the detected clusters may then be further analyzed by counting the number of common elements, i.e., nodes, between each pair of detected clusters. For this purpose, a square matrix A of size of N×N may be utilized, where N is the number of different detected clusters. In this matrix A, each matrix element $a_{ij}$ indicates the number of common elements between the cluster i and the cluster j (with i, j being indices identifying the different detected clusters). The matrix diagonal may be filled with zeros. Further, a vector v of size N may be determined which contains the number of elements, i.e., nodes, in each cluster. That is to say, each vector element $v_i$ of the vector v indicates the number of nodes in the cluster with index i.

For the exemplary clusters of FIG. 5, this yields:

$$A = \begin{pmatrix} 0 & 2 & 2 & 2 & 2 & 2 \\ 2 & 0 & 0 & 3 & 3 & 0 \\ 2 & 0 & 0 & 0 & 3 & 0 \\ 2 & 3 & 0 & 0 & 4 & 0 \\ 2 & 3 & 3 & 4 & 0 & 0 \\ 2 & 0 & 0 & 0 & 0 & 0 \end{pmatrix}$$

and $$v = (2\ \ 3\ \ 3\ \ 4\ \ 5\ \ 3).$$

From the matrix A, a further matrix G may be derived which describes the directed graph of cluster hierarchy relations, as for example shown in FIG. 5. The matrix G indicates whether a certain cluster is a subset of another cluster. For example, cluster i may be identified as being a subset of cluster j only if each element in cluster i is also an element in cluster j. In the matrix G, this may be indicated by setting matrix element $g_{ij}$ to "logical true" or "1". Otherwise, if cluster i is not identified as being a subset of cluster j, the matrix element $g_{ij}$ may be set to "logical false" or "0".

In some implementations, a probabilistic measure may be used for representing cluster relationships. For example, cluster i may be regarded as a subset of cluster j with a certain probability if a part of its elements are also present in cluster j. This probability may be represented by a value in the interval [0,1]. Considering only the exact matches for the clusters of FIG. 5 yields:

$$G = \begin{pmatrix} 0 & 1 & 1 & 1 & 1 & 1 \\ 0 & 0 & 0 & 1 & 1 & 0 \\ 0 & 0 & 0 & 0 & 1 & 0 \\ 0 & 0 & 0 & 0 & 1 & 0 \\ 0 & 0 & 0 & 0 & 0 & 0 \\ 0 & 0 & 0 & 0 & 0 & 0 \end{pmatrix}.$$

The matrix G represents an adjacency matrix of a directed graph which describes the relationships of the clusters. The vertices of the graph correspond to clusters of nodes, and the edges define an inclusion relation, optionally with a certain edge weight corresponding to the above-mentioned probability.

For determining the above-mentioned probabilistic measures representing cluster relationships, the matrix A and the vector v may be utilized. For example, the probabilistic measures may be calculated from the elements of the matrix A and the vector v.

Here, it should be noted that in practical scenarios the matrix G may have considerable size and include non-connected subgraphs, i.e., clusters or groups of clusters without any inclusion relationship to the rest of the clusters in the matrix G. In this case, also a process of separating such non-connected subgraphs from each other may be performed. In the example of FIG. 5, there are no such non-connected subgraphs. However, the hierarchy graph of FIG. 5 may be regarded as an example of a subgraph as obtained by separating a larger hierarchy graph into subgraphs.

In a further stage, the hierarchy graph may be simplified by removing edges which point beyond the nearest higher hierarchy level. For example, CLUSTER 1 of FIG. 5 has an edge pointing to CLUSTER 2, an edge pointing to cluster 4, and an edge pointing to cluster 5. However, CLUSTER 2 is also a subset of CLUSTER 4 and of CLUSTER 5. Therefore, the edges towards CLUSTER 4 and CLUSTER 5 go beyond the nearest higher hierarchy level and may be removed. Such removal may reflect that a generally tree-like topology is expected. In the example of FIG. 5, the simplification results in removal of the edges represented by dashed arrows. The corresponding adjacency matrix G then becomes:

$$G = \begin{pmatrix} 0 & 1 & 1 & 0 & 0 & 1 \\ 0 & 0 & 0 & 1 & 0 & 0 \\ 0 & 0 & 0 & 0 & 1 & 0 \\ 0 & 0 & 0 & 0 & 1 & 0 \\ 0 & 0 & 0 & 0 & 0 & 0 \\ 0 & 0 & 0 & 0 & 0 & 0 \end{pmatrix}.$$

Figure 6:
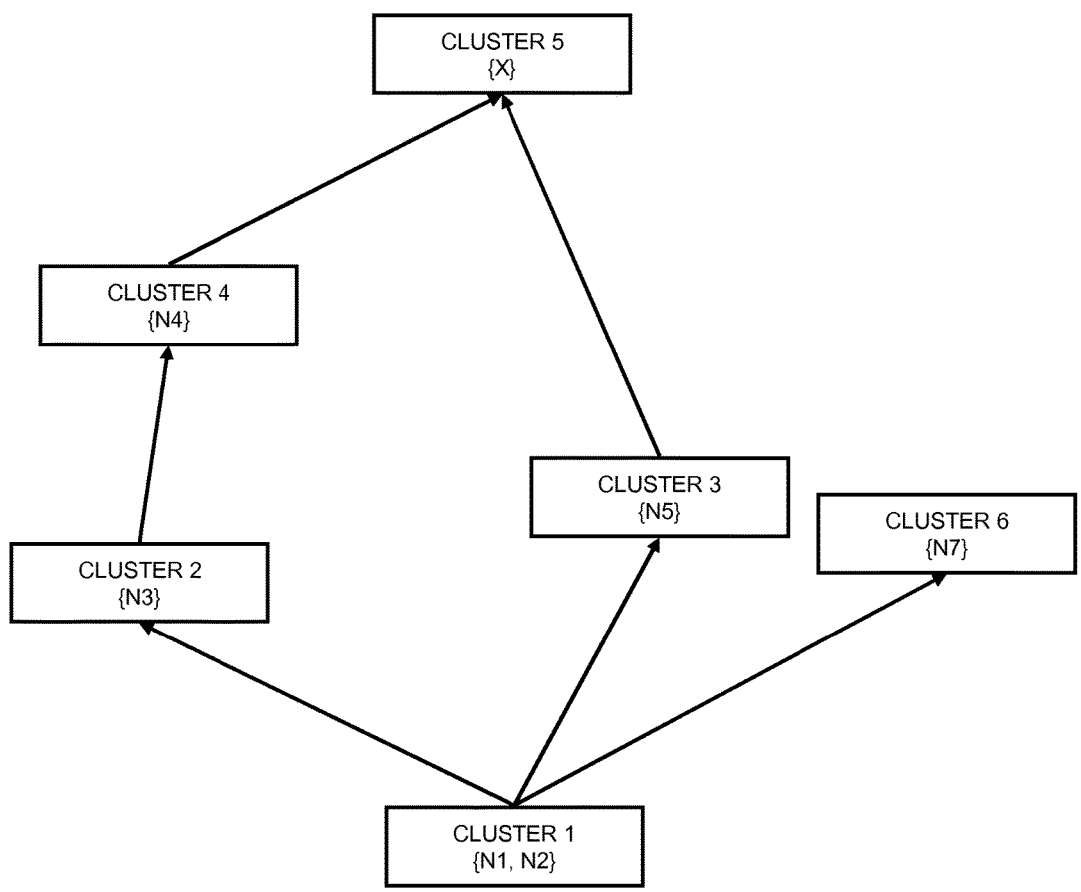
FIG. 6 shows a network topology model as determined from the hierarchy of clusters in FIG. 5.

In a next stage, the simplified cluster hierarchy graph may be converted to a node graph, which represents the topology model. For this purpose, the nodes of the subsets are removed from each cluster, starting from the smallest cluster and moving towards the higher cluster hierarchy levels. In the example of FIG. 5, this means that the nodes N1 and N2 (elements of CLUSTER 1, which is a subset of CLUSTER 2, CLUSTER 3, and CLUSTER 6) are removed from CLUSTER 2, CLUSTER 3, and CLUSTER 6. Further, the nodes N1, N2, N3 (elements of CLUSTER 2, which is a subset of CLUSTER 4) are removed from CLUSTER 4. Further, the nodes N1, N2, N3, N4 (elements of CLUSTER 4, which is a subset of CLUSTER 5) are removed from CLUSTER 5. Further, the node N5 (element of CLUSTER 3, which is a subset of CLUSTER 5) and the node N7 (element of CLUSTER 6, which is a subset of CLUSTER 5) are removed from CLUSTER 5. The result is shown in FIG. 6. As can be seen, the graph of FIG. 6 generally reveals a tree-like topology in which at least some vertices are formed by individual nodes. However, in some cases (such as exemplified by CLUSTER 1), the internal structure of a vertex may remain hidden. Such hidden structures may however be revealed by including further network events into the analysis. Further, it should be noted that the empty CLUSTER 5 in the graph of FIG. 6 (as indicated by {X}) may be a result of an accidental coincidence of network events being detected as correlation or of an undetected correlation, could be deleted. Another possible reason of having vertices with no remaining nodes in the cluster might be that a link failure occurred to a node which did not give alarm or is not supervised by the management system. This may for example be the case if the node is an aggregation point in backhaul and there is no base station at the site of the node.

As a more general rule, the generated topology model may be subjected to processes for resolving inconsistencies, refinement of the topology model, or updating the topology model.

An inconsistency may for example be indicated by a deviation of the obtained node graph from a tree-like structure. For example, CLUSTER 2 and CLUSTER 4 in FIG. 6 do not include the node N5. If they did, then CLUSTER 3 would be located on the same branch as CLUSTER 2 and CLUSTER 4. Accordingly, the deviation from the tree-like structure as visible in FIG. 6 could be due to missing detection of correlations to network event from the node N5.

Another reason might be an actual change in the network topology. Since in the illustrated concepts the determination of the topology model may be regarded as a gradual learning process, a change of the network topology may result in inconsistencies between new data and previous observations. This may for example be addressed by utilizing probabilistic measures for describing relationships between the clusters. For example, in the example of FIG. 5, we can define probabilistic measure for the subset identification may require that $2/3^{rd}$ of the elements to be common in the considered clusters. This would have the effect that CLUSTER 2 and CLUSTER 3 would be mutually be subsets of each other and that CLUSTER 3 would be a subset of Cluster 4. As a result, CLUSTER 2 and CLUSTER 3 could be unified and deviations of the node graph from a tree-like structure would be removed.

Another way to address conflicting observations of correlations of network events is to keep conflicting branches of the node graph temporarily and monitor the number of newly detected correlations of network events supporting each branch. In response to one of the conflicting branches being dominantly supported by the detected correlations, the other conflicting branch may be removed from the node graph. This solution may also allow for efficiently addressing changes of the network topology. For example, the presence of CLUSTER 6 in the node graph of FIG. 6 could be a result of network reconfiguration. Accordingly, newly detected correlations of network events may be monitored with respect to whether they are consistent with the branch including CLUSTER 6. If a predominant number of the detected correlations turns out to be inconsistent with the branch, the branch may be removed from the node graph.

As a further possibility, the node graph may be subjected to a verification process on the basis of additional information on the nodes, such as geographical information. For example, the geographical locations of at least some of the nodes could be known at the management node 100. Accordingly, such information may be utilized for checking consistency with the node graph. By way of example, the geographical locations of the nodes N1, N2, and N7 may be utilized to determine whether the illustrated edge between CLUSTER 1 and CLUSTER 6 in FIG. 6 is consistent and should be kept.

Figure 7:
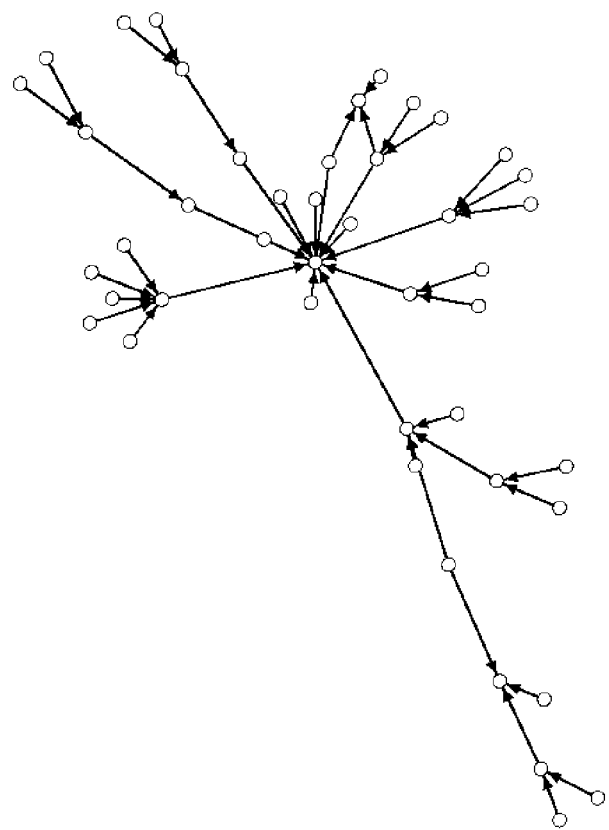
FIG. 7 illustrates an exemplary network topology model as obtained according to an embodiment of the invention.

FIG. 7 illustrates an example more complex topology model as obtained in a practical scenario considering alarms from base stations of a cellular network. It should be noted that the illustrated topology model only represents a part of the overall communication network. In the example of FIG. 7, a Yifan Hu graph drawing algorithm was utilized. However, other graph drawing algorithms could be utilized as well. A multi-hop tree-like structure can be recognized from the illustrated node graph. The exemplary node graph of FIG. 7 was obtained by off-line processing alarm data collected over several months. Strong filtering was applied in the identification of clusters by requiring that each cluster had to occur at least three times to be considered as detected and utilized for the determination of the cluster hierarchy.

In the example of FIG. 7, alarms may for example be due to problems with microwave links in the backhaul network. While faulty equipment may be a reason for such problems, often they may be merely caused by unfavorable weather conditions. A failed microwave link may, however, result in failed backhaul connections to multiple base stations. A control node, such as a base station controller (BSC) of the GSM technology or a Radio Network Controller (RNC) of the UMTS technology, may detect the base stations with failed backhaul connections from the suspended communication and it sends the alarms concerning these base stations. However, such alarm might be lost or the failed backhaul connection might not be detected for all concerned base stations, e.g., if there is no ongoing communication. The topology model may then be useful for recognizing that multiple alarms are due to the same failed microwave link, which means that they can be grouped under a single trouble ticket. Further, the topology model may help to identify further affected based stations, for which an alarm was not yet reported.

Figure 8:
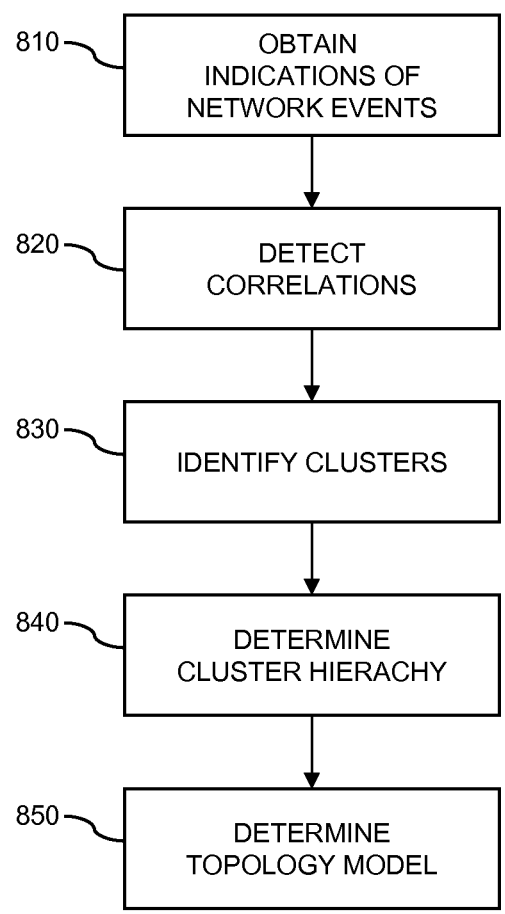
FIG. 8 shows a flowchart for illustrating a method of managing a communication network according to an embodiment of the invention.

FIG. 8 shows a flowchart for illustrating a method of managing a communication network, e.g., having structures as illustrated in FIG. 1. The method of FIG. 8 may be used for implementing the above-described concepts in a management node of the communication network, e.g., the management node 100 of FIG. 1. If a processor based implementation of the management node is used, the steps of the method may be performed by one or more processors of the management node. For this purpose, the processor(s) may execute correspondingly configured program code. Further, at least some of the corresponding functionalities may be hardwired in the processor(s).

At step 810, the management node obtains indications of network events occurring at a plurality of nodes of the communication network. For example, such nodes may be part of a backhaul of a cellular communication network, e.g., as explained in connection with FIG. 1. The indications of network events may for example be obtained through event reports from at least some of the nodes. The network events may for example include alarms concerning the nodes.

At step 820, the management node performs a correlation of times of the indicated network events. For this purpose, the management node may check whether two or more of the network events occur in a certain time window, e.g., as explained in connection with FIG. 3. In response to two or more of the network events occurring in the time window, the management node may detect these more network events as being correlated. In some implementations, the time window may be variable, e.g., by extending the time window each time when a further correlated network event is detected.

At step 830, the management node identifies clusters of nodes with correlated network events. This is accomplished on the basis of the correlation performed at step 820. This may be implemented by assigning those nodes to the same cluster for which correlated network events were detected at step 820. Each node may be an element of different clusters, and the clusters may occur repeatedly, e.g., if a similar pattern of correlated network event reoccurs. In some implementations, such repeated occurrence of a similar pattern of correlated network events may also be used as a criterion for the identification of clusters of nodes with correlated network events. For example, the identification of clusters may involve detecting correlations of at least some of the indicated network events and, if for a group of the nodes the number of detected correlations exceeds a threshold, e.g., of three, identifying the group as one of the clusters of nodes with correlated network events.

At step 840, the management node may determine a hierarchy of the clusters. An example of such cluster hierarchy is illustrated in FIG. 5. The hierarchy of the clusters may be identified by comparing the clusters and indicates, for each of the clusters, whether the nodes of the cluster are estimated to be a subset of the nodes of one or more of the other clusters. The hierarchy of the clusters may also be represented by a matrix, such as the above-mentioned adjacency matrix G. In some implementations, the requirements for identifying a certain cluster as a subset of another cluster may also be defined on the basis of a probabilistic measure, e.g., by not requiring a perfect match of the elements of the cluster to the elements of the other cluster, but only a certain degree of overlap between the elements of the compared clusters.

At step 850, the management node determines a topology model of the communication network. This is accomplished on the basis of the clusters. In particular, the management node may determine the topology model on the basis of the hierarchy of clusters as determined at step 840. For example, in response to the hierarchy indicating that a first cluster of the clusters is estimated to be a subset of a second cluster of the clusters, the management node may assume in the topology model that a link exists between a first vertex formed of the nodes of the first cluster and a second vertex formed of one or more nodes of the second cluster, which are not elements of the first cluster. In this way, a node graph may be derived from the cluster hierarchy. Examples of such derived node graphs are illustrated in FIGS. 6 and 7.

The determination of the topology model at step 850 may also involve determining a network element which is a candidate to be a common source of the network events indicated by the nodes of the at least one cluster. Such network element may be a node of the communication network or a link between nodes of the communication network. An example of such network element is the failed link between NODE 1 and NODE 3 as illustrated in FIG. 4.

Figure 9:
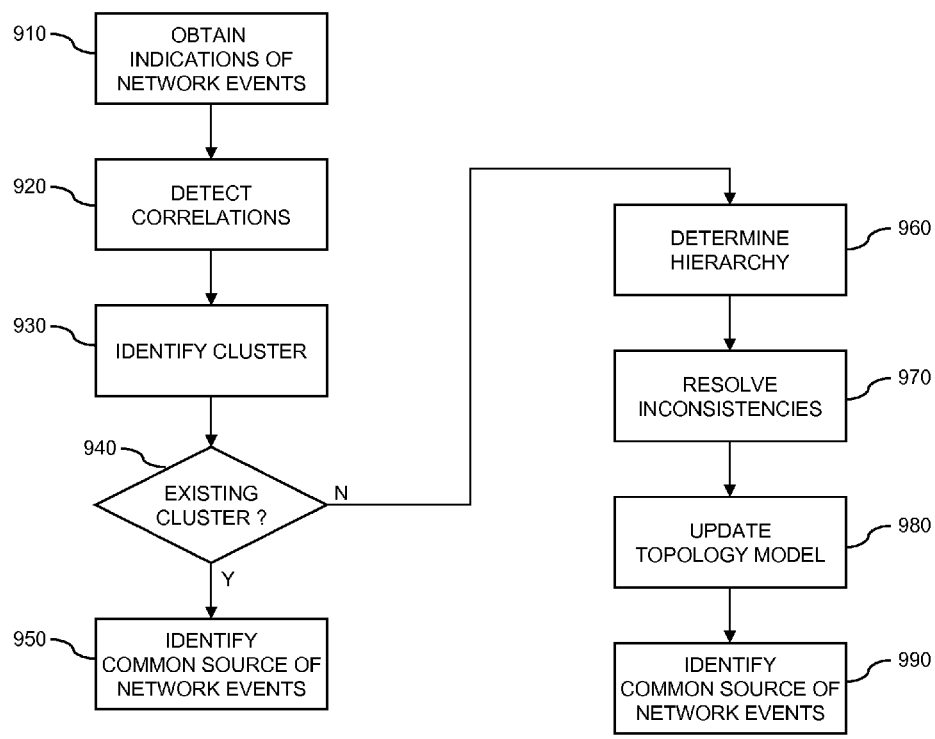
FIG. 9 shows a flowchart for illustrating a further method according to an embodiment of the invention, which may be used for considering newly indicated network events in a continuous manner.

FIG. 9 shows a flowchart for illustrating a further method which may be used by the management for continuous maintenance and application of the topology model as for example derived by the method of FIG. 8. Again, if a processor based implementation of the management node is used, the steps of the method may be performed by one or more processors of the management node. For this purpose, the processor(s) may execute correspondingly configured program code. Further, at least some of the corresponding functionalities may be hardwired in the processor(s).

At step 910, obtains further indications of further network events occurring at at least some of the plurality of nodes. Again, the indications of network events may for example be obtained through event reports from at least some of the nodes. The network events may for example include alarms concerning the nodes.

At step 920, the management node performs a further correlation of times of the indicated further network events and, on the basis of the further correlation, detects a correlation of at least some of the indicated network events.

At step 930, the management node may identify at least one further cluster of nodes with correlated network events. This may be accomplished in a similar manner as explained in connection with step 830 of FIG. 8.

At step 940, the management node may check whether the cluster newly identified at step 930 corresponds to an existing cluster as previously detected. If this is the case, the management node may proceed with utilizing the existing topology model to address the indicated network events, as indicated by branch "Y". For example, as indicated by step 950, the management node may utilize the existing topology model to identify a common source of the indicated network events, e.g., a link failure or a node failure.

If the newly identified cluster is found to not correspond to an existing cluster, as indicated by branch "N", the management node may proceed with further processes for checking consistency of the detected correlation with the topology model and/or for updating the topology model if needed, e.g., as indicated by steps 960, 970, and 980.

For example, as indicated by step 960, the management node may utilize the newly identified cluster to re-determine or update the hierarchy of clusters. In some cases, the newly identified cluster may fit into the existing hierarchy of clusters and provide additional information for a refined analysis, e.g., for identifying substructures of a vertex with multiple nodes. In some cases, the newly identifies cluster may also be inconsistent with the existing topology model, e.g., due to a change of the underlying network topology.

If the newly detected correlations and/or newly identified cluster are found to be inconsistent with the existing topology model, the management node may attempt to resolve such inconsistencies, as indicated by step 870. For example, this may involve utilizing additional information, such as on the geographical location of the nodes, to identify certain correlations as being accidental coincidences. This may also involve monitoring further detected correlations in favour of different conflicting parts of the topology model and keeping those of the conflicting parts which are predominantly supported by the further detected correlations.

At step 980, if the management node decides that the newly detected correlations and/or the newly identified cluster is not accidental, the management node may proceed to updating the topology model accordingly. This may be accomplished in a similar manner as explained in connection with FIG. 7, but now also taking into account the newly detected correlations and/or the newly identified cluster. Accordingly, on the basis of the already identified clusters and the newly identified cluster, the management node may determine an updated topology model of the communication network.

The method of FIG. 9 may be repeated whenever new indications of network events become available.

The topology model as determined in the method of FIG. 8 and/or 9 may be utilized in various ways. For example, in some scenarios the management node may receive a plurality of alarms concerning at least some of the network nodes. The management node may then utilize the topology model to assess whether the alarms have a common source, e.g., a failed link or node. In response to the topology model indicating that the alarms have a common source, the management node may generate a single trouble ticket for the alarms. In this way, addressing the alarms may be simplified significantly. Further, also elimination of the source of the alarm may be facilitated. In some cases, the topology model may also allow for taking preventive actions. For example, the topology model may allow for inferring that one or more nodes are affected by an alarm, even if such alarm was not yet reported for these nodes.

Figure 10:
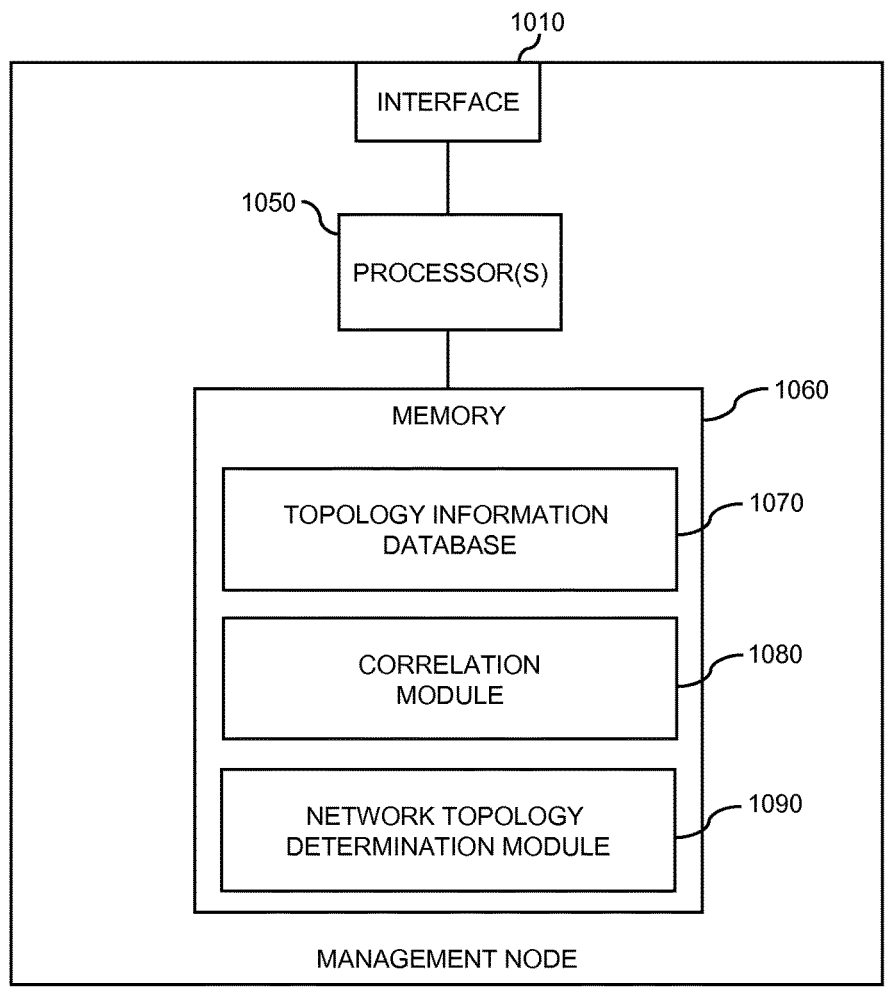
FIG. 10 schematically illustrates structures of a management node according to an embodiment of the invention.

FIG. 10 illustrates exemplary structures for implementing a management node which operates in accordance with the above-described concepts. For example, the illustrated structures may be used to implement the management node 100 and the topology model generator 110.

As illustrated, the management node may include an interface 1010 for obtaining indications of network events. For example, the interface 1010 may correspond to a management interface with support of event reporting functionalities.

Further, the management node includes one or more processor(s) 1050 coupled to the interface 1010, and a memory 1060 coupled to the processor(s) 1050. The memory 1060 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 1060 includes suitably configured program code modules to be executed by the processor(s) 1050 so as to implement the above-described functionalities of the management node, e.g., as illustrated by the methods of FIGS. 8 and 9. As further illustrated, the memory may also include a topology information database 1070 for storing obtained information on network events, clusters, cluster hierarchy, and/or node relationships. The topology information database 1070 may be continuously updated while obtaining and analyzing new network events. The program code modules in the memory 1060 may include a correlation module 1080 so as to implement the above-described functionalities of performing a time correlation of network events, e.g., as explained in connection with step 820 of FIG. 8 and step 920 of FIG. 9. Further, the program code modules in the memory 1060 may include a network topology determination module 1090 so as to implement the above-described functionalities of identifying clusters and deriving the network topology model from the relationships between the identified clusters.

It is to be understood that the structures as illustrated in FIG. 10 are merely schematic and that the management node may actually include further components which, for the sake of clarity, have not been illustrated, e.g., further interfaces or further processors. Also, it is to be understood that the memory 1060 may include further types of program code modules, which have not been illustrated, e.g., program code modules for implementing known functionalities of a management node. In some implementations, also a computer program may be provided for implementing functionalities of the management node, e.g., in the form of a physical medium storing the program code modules to be stored in the memory 1060 or by making such program code available for download or streaming.

As can be seen, the concepts as described above may be used for efficiently managing a communication network. Specifically, the concepts may be used for deriving and maintaining a topology model of the communication network without requiring dedicated functionalities of the managed nodes of the communication network. Rather, existing event reporting functionalities may be utilized.

The derived topology model allows for grouping multiple alarms under a single trouble ticket and therefore facilitates handling of the alarms. Further, the topology model may provide valuable assistance in identification of the underlying alarm cause. The topology model for example also be helpful when an alarm is generated at an aggregation point of the backbone network and the type of the alarm indicates that other nodes beyond the aggregation point might be affected. This may for example be the case when failure of a major link failure cuts off nodes on further branches of a tree-like network topology. The topology model may then allow for identifying nodes which are affected by the failure, without requiring that alarms are reported specifically for these nodes.

It is to be understood that the examples and embodiments as explained above are merely illustrative and susceptible to various modifications. For example, the concepts may be applied in various kinds of communication networks, without limitation to the illustrated example of a cellular communication network. For example, the concepts could also be applied to various kinds of wireline or wireless communication networks. Moreover, it is to be understood that the above concepts may be implemented by using correspondingly designed software to be executed by one or more processors of an existing device, or by using dedicated hardware.

The invention claimed is:

1. A method of managing a communication network, the method comprising:
   obtaining, by a management node, indications of network events occurring at a plurality of nodes of the communication network;
   performing, by the management node, a correlation of times of the indicated network events;
   identifying, by the management node, based on the correlation, clusters of nodes with the correlated network events;
   determining, by the management node, based on the clusters, a topology model of the communication network, wherein the determining the topology model comprises comparing the clusters to identify a hierarchy of the clusters, and the hierarchy indicating, for each of the clusters, whether the cluster is estimated to be a subset of one or more of other clusters; and
   in response to the hierarchy indicating that a first cluster of the clusters is estimated to be a subset of a second cluster of the clusters, assuming, by the management node, in the topology model that a link exists between a first vertex formed of nodes of the first cluster and a second vertex formed of one or more nodes of the second cluster, which are not elements of the first cluster.

2. The method of claim 1, wherein the determining the topology model further comprises determining a network element which is a candidate to be a common source of the network events indicated by nodes of at least one cluster of the clusters.

3. The method of claim 1, further comprising:
   obtaining, by the management node, further indications of further network events occurring at, at least some of the plurality of nodes of the communication network;
   performing, by the management node, a further correlation of times of the indicated further network events;
   based on the further correlation, detecting, by the management node, a correlation of at least some of the indicated network events; and
   checking consistency, by the management node, of the detected correlation with the topology model.

4. The method of claim 3, further comprising, in response to the detected correlation being inconsistent with the topology model, deciding, by the management node, between:
   updating the topology model; and
   identifying the detected correlation as being accidental.

5. The method of claim 4, wherein the updating the topology model comprises:
   identifying at least one further cluster of nodes with the correlated network events; and
   based on the clusters and the at least one further cluster, determining an updated topology model of the communication network.

6. The method of claim 1, wherein the identifying the clusters of nodes with the correlated network events comprises:
   based on the correlation, detecting correlations of at least some of the indicated network events; and
   if, for a group of the nodes, a number of the detected correlations exceeds a threshold, identifying the group as one of the clusters of nodes with the correlated network events.

7. The method of claim 1, wherein the identifying the clusters of nodes with the correlated network events comprises, in response to two or more of the network events occurring in a time window, detecting the two or more network events as being correlated.

8. The method of claim 1, wherein the network events comprise alarms concerning nodes of the plurality of nodes.

9. The method of claim 1, further comprising:
receiving, by the management node, a plurality of alarms concerning at least some nodes of the plurality of nodes; and
in response to the topology model indicating that the plurality of alarms has a common source, generating, by the management node, a single trouble ticket for the plurality of alarms.

10. A management node for a communication network, the management node comprising:
processing circuitry; and
memory containing instructions executable by the processing circuitry, whereby the management node is operative to:
obtain indications of network events occurring at a plurality of nodes of the communication network;
perform a correlation of times of the indicated network events;
based on the correlation, identify clusters of nodes with the correlated network events;
based on the clusters, determine a topology model of the communication network, wherein the instructions are such that the management node is operative to determine the topology model by comparing the clusters to identify a hierarchy of the clusters, and the hierarchy indicating, for each of the clusters, whether the cluster is estimated to be a subset of one or more of other clusters; and
in response to the hierarchy indicating that a first cluster of the clusters is estimated to be a subset of a second cluster of the clusters, assume in the topology model that a link exists between a first vertex formed of nodes of the first cluster and a second vertex formed of one or more nodes of the second cluster, which are not elements of the first cluster.

11. The management node of claim 10, wherein the instructions are such that the management node is operative to determine the topology model further by determining a network element which is a candidate to be a common source of the network events indicated by nodes of at least one cluster of the clusters.

12. The management node of claim 10, wherein the instructions are such that the management node is further operative to:
obtain further indications of further network events occurring at, at least some of the plurality of nodes of the communication network;
perform a further correlation of times of the indicated further network events;
based on the further correlation, detect a correlation of at least some of the indicated network events; and
check consistency of the detected correlation with the topology model.

13. The management node of claim 12, wherein the instructions are such that the management node is further operative to, in response to the detected correlation being inconsistent with the topology model, decide between updating the topology model and identifying the detected correlation as being accidental.

14. The management node of claim 13, wherein the instructions are such that the management node is operative to update the topology model by:
identifying at least one further cluster of nodes with the correlated network events; and
based on the clusters and the at least one further cluster, determining an updated topology model of the communication network.

15. The management node of claim 10, wherein the instructions are such that the management node is operative to identify the clusters of nodes with the correlated network events by:
based on the correlation, detecting correlations of at least some of the indicated network events; and
if, for a group of the nodes, a number of the detected correlations exceeds a threshold, identifying the group as one of the clusters of nodes with the correlated network events.

16. The management node of claim 10, wherein the instructions are such that the management node is operative to identify the clusters of nodes with the correlated network events by, in response to two or more of the network events occurring in a time window, detecting the two or more network events as being correlated.

17. The management node of claim 10, wherein the network events comprise alarms concerning nodes of the plurality of nodes.

18. The management node of claim 10, wherein the instructions are such that the management node is further operative to:
receive a plurality of alarms from at least some nodes of the plurality of nodes; and
in response to the topology model indicating that the plurality of alarms has a common source, generate a single trouble ticket for the plurality of alarms.

* * * * *